(No Model.)
R. WOODS.
HARROW CULTIVATOR FOR LISTED CORN.
No. 359,988. Patented Mar. 22, 1887.
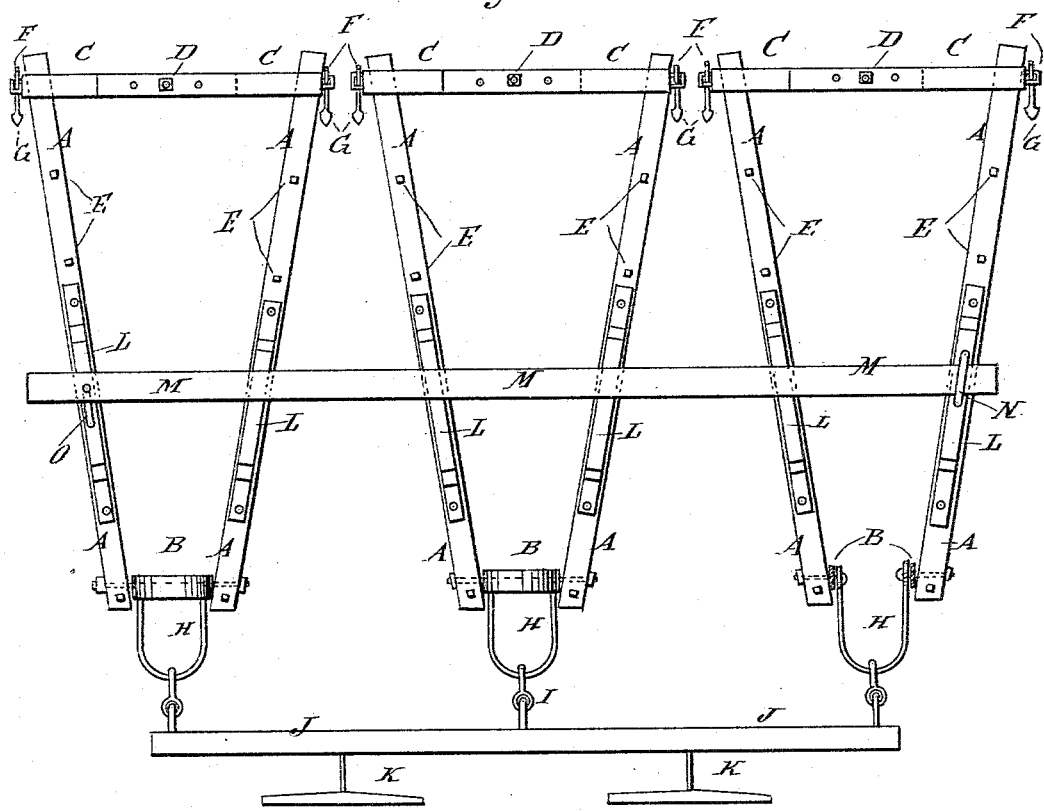
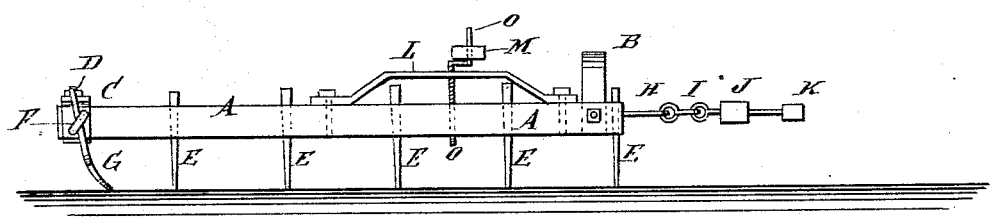
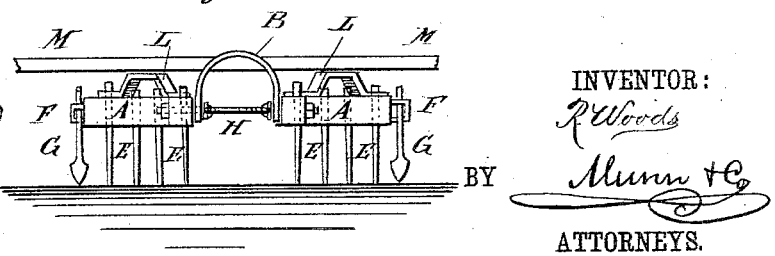
WITNESSES:
Chas. Niola
C. Sedgwick
INVENTOR:
R Woods
BY Munn & Co
ATTORNEYS.

UNITED STATES PATENT OFFICE.

ROLLIN WOODS, OF MANKATO, KANSAS.

HARROW-CULTIVATOR FOR LISTED CORN.

SPECIFICATION forming part of Letters Patent No. 359,988, dated March 22, 1887.

Application filed April 28, 1886. Serial No. 300,433. (No model.)

*To all whom it may concern:*

Be it known that I, ROLLIN WOODS, of Mankato, in the county of Jewell and State of Kansas, have invented a new and useful Improvement in Harrow-Cultivators for Listed Corn, of which the following is a full, clear, and exact description.

Reference is to be had to the accompanying drawings, forming a part of this specification, in which similar letters of reference indicate corresponding parts in all the figures.

Figure 1 is a plan view of my improved harrow-cultivator, partly in section. Fig. 2 is a side elevation of the same. Fig. 3 is a front elevation of one section of the same, the end parts of the leveling-bar being broken away.

The object of this invention is to provide harrow-cultivators for listed corn, constructed in such a manner that they can be successfully used when the corn is very small, and can be readily adjusted to cut down more of the ridges as the corn increases in height.

The invention consists in the construction and combination of the various parts of the harrow-cultivator, as will be hereinafter fully described.

The harrow-cultivator is made in three sections, and is designed to harrow three rows of corn at a time. Each section is formed of two beams, A, the forward ends of which are placed at such a distance apart as to pass along the opposite sides of a row of plants, and are connected by an arched bar, B, of such a length as to pass over the plants without injuring them.

The rear ends of the beams A are connected by bars C, the outer ends of which are secured to the said beams A. The inner ends of the bars C are overlapped, and are perforated to receive the bolts D, by means of which they are secured to each other. Several holes are formed in the bars C to receive the bolts D, so that the rear ends of the beams A can be readily adjusted at a greater or a less distance apart, as may be required. To the beams A are attached harrow-teeth E in the ordinary manner. To the outer sides of the rear ends of the beams A, or to the outer ends of the cross-bars C, are secured by U-shaped bolts or clamps F, or other suitable means, small cultivator-teeth G.

To the forward ends of the beams A are pivoted by the bolts that secure the arched bars B to the said beams, or by other suitable means, the ends of the bails H, which are connected by clevises, links I, or other suitable couplings, with the long draw-bar J, to which, in front of the spaces between the harrow-sections, are connected the whiffletrees K, to which the draft is applied, so that the horses will walk along the ridges while the said sections work in the hollows between the ridges and upon the opposite sides of the rows of plants planted in the said hollows, the teeth E, loosening the soil at the opposite sides of the rows of plants, and the cultivator-teeth G plowing down the sides of the ridges, ready to be thrown around the plants at subsequent operations.

As the plants increase in size the rear ends of the beams A are adjusted farther apart, so that more of the ridges will be plowed into the hollows.

To the upper sides of the forward parts of the beams A are attached long raisers L, over which is passed a bar, M, to keep the harrow-sections level, while allowing the said sections to play under the said bar. One end of the leveling-bar M passes between the arms of the staple N, which pass through the raiser L and into the outer beam, A, of one of the side sections. The other end of the leveling-bar M is secured to the outer beam, A, of the other side section by a crank-screw, O, passing through the raiser L and the bar M and screwing into the said beam A.

Having thus fully described my invention, I claim as new and desire to secure by Letters Patent—

1. A harrow-cultivator consisting of three sections, each composed of two diverging beams, A, connected at their forward ends by arched bars B and at their rear ends by adjustable overlapping bars C and bolts D, and provided with harrow-teeth E and cultivator-teeth G, secured to the outer sides of the rear ends of the beams, the several sections being connected by the bar M, having its ends loosely connected to the outer beams of the side sections, substantially as herein shown and described.

2. In a harrow-cultivator, the combination, with the beams A, provided with the raisers L, of the staple N, the bar M, having one end passed through said staple, and the crank-screw O, substantially as herein shown and described.

ROLLIN WOODS.

Witnesses:
C. MCCARTHY,
E. W. MILLER.